United States Patent
Ali

(10) Patent No.: US 7,231,548 B2
(45) Date of Patent: Jun. 12, 2007

(54) DIAGNOSIS OF FAULT CONDITIONS IN EMBEDDED SYSTEMS

(75) Inventor: Rafiq Ali, Templestown (AU)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 10/095,029

(22) Filed: Mar. 12, 2002

(65) Prior Publication Data

US 2002/0194537 A1    Dec. 19, 2002

(30) Foreign Application Priority Data

Mar. 13, 2001    (AU) ...................... PR3693

(51) Int. Cl.
*G06F 11/00*    (2006.01)
(52) U.S. Cl. .......................... 714/25; 714/26
(58) Field of Classification Search ................. 714/25, 714/27, 31, 26
See application file for complete search history.

(56) References Cited

U.S. PATENT DOCUMENTS

| | | | | |
|---|---|---|---|---|
| 5,793,945 A | * | 8/1998 | Tabata et al. | 714/25 |
| 6,260,160 B1 | * | 7/2001 | Beyda et al. | 714/27 |
| 6,532,552 B1 | * | 3/2003 | Benignus et al. | 714/25 |
| 6,598,173 B1 | * | 7/2003 | Sheikh et al. | 714/4 |
| 6,651,190 B1 | * | 11/2003 | Worley et al. | 714/43 |
| 6,697,962 B1 | * | 2/2004 | McCrory et al. | 714/27 |
| 2001/0007138 A1 | * | 7/2001 | Iida et al. | 714/25 |

\* cited by examiner

*Primary Examiner*—Yolanda L Wilson
(74) *Attorney, Agent, or Firm*—Squire, Sanders & Dempsey L.L.P.

(57) ABSTRACT

An embedded system (100) comprising a microprocessor module (10) connected to a remote master controller (30) is described, wherein diagnostic code is not loaded into the microprocessor module (10) at normal execution time, but is dynamically loaded from the remote master controller (30) when a fault is detected. The diagnostic code may be used to "work around" fault conditions, or to further diagnose the fault to a more specific level.

18 Claims, 4 Drawing Sheets

DIAGNOSIS OF FAULT CONDITIONS IN EMBEDDED SYSTEMS

TECHNICAL FIELD OF THE INVENTION

The present invention relates generally to the field of embedded microprocessor based systems and, in particular, to fault diagnosis in such systems.

BACKGROUND ART

Microprocessor-based embedded systems are often used to control processes, collect data, and perform computations. They are usually hidden in equipment, and have no man-machine interface, such as a keyboard Embedded systems find applications in consumer electronics, industrial electrical equipment and in telecommunications, for example.

The microprocessor of an embedded system has the capability to detecting a number of internal faults and abnormal operation of one or more of the external devices connected to it. Such devices may include a number of sensor devices and actuators. Known embedded systems have a limited capability to "work around" an abnormal or fault condition. In most instances of abnormal and fault conditions, the embedded system will fail and alarm conditions are raised to bring the fault(s) to the attention of an operator or technical support person. The operator or technical support person is then required to service the embedded system.

Often such systems are located remotely. In such instances, it is advantageous for alarm conditions to be communicated via a communications link to a master controller, which is some distance away from the embedded system. Servicing typically includes a service technician being called to the site and replacing the faulty embedded system, sensor device or actuator. This imposes a considerable cost, and also may result in significant "downtime" for the equipment which the embedded system controls, The cost sensitivity and size restrictions of such systems restrict the implementation of complex fault diagnosis and fault rectification applications in the system. In particular, many embedded systems have limited Read Only Memory for storing code and Random Access Memory for use as workspace when executing such code.

SUMMARY OF THE INVENTION

It is an object of the present invention to substantially overcome, or at least ameliorate, one or more disadvantages of existing arrangements.

According to a first aspect of the invention, there is provided a method of diagnosing one or more fault conditions associated with an embedded system, said embedded system having limited storage capacity to hold diagnostic code, said method comprising the steps of:
 determining fault information of said fault condition(s);
 communicating fault information from said embedded system to a master controller;
 receiving diagnostic code corresponding with said fault information from said master controller; and
 executing said diagnostic code.

According to a second aspect of the invention, there is provided an embedded system having fault diagnosis capability, said system comprising:
 limited memory for storing operation and diagnostic code;
 a processor executing said operational and diagnostic code; and
 a communications port by which data is transmitted and received;
 and wherein, upon detection of a fault condition, said processor requests diagnostic code from a remote side via said communications port, said diagnostic code being received, stored in said memory and executed by said processor.

According to a third aspect of the invention, there is provided a computer program product, carried on a storage medium, for diagnosing one or more fault conditions associated with an embedded system, said embedded system having limited storage capacity to hold diagnostic code, said computer program product comprising:
 code for determining fault information of said fault condition(s);
 code for communicating fault information from said embedded system to a master controller;
 code for receiving diagnostic code corresponding with said fault information from said master controller; and
 code for executing said diagnostic code.

The embedded system may additionally establish a communication link with the master controller.

Preferably, the method comprises the further steps of:
 communicating results from executing the diagnostic code to the master controller; and
 in the event that the results are insufficient receiving further diagnostic code from the remote controller.

Preferably, where the fault condition(s) relates to faulty circuitry in the embedded system, and the diagnostic code causes switching to redundant circuitry in the embedded system.

Preferably, where the fault condition(s) relates to faulty circuitry of auxiliary equipment connected to the embedded system, and the diagnostic code causes switching to redundant circuitry of the auxiliary equipment.

Preferably, where the fault condition(s) relates to a faulty sensor device connected to the embedded system and the diagnostic code interpolates between values of related sensor devices to estimate a value of the faulty sensor device.

Preferably the diagnostic code includes patch code or an upgrade to system code.

Preferably the master controller is remote from the embedded system.

BRIEF DESCRIPTION OF THE DRAWINGS

One or more embodiments of the present invention will now be described with reference to the drawings, in which.

DETAILED DESCRIPTION INCLUDING BEST MODE

Figure 1:
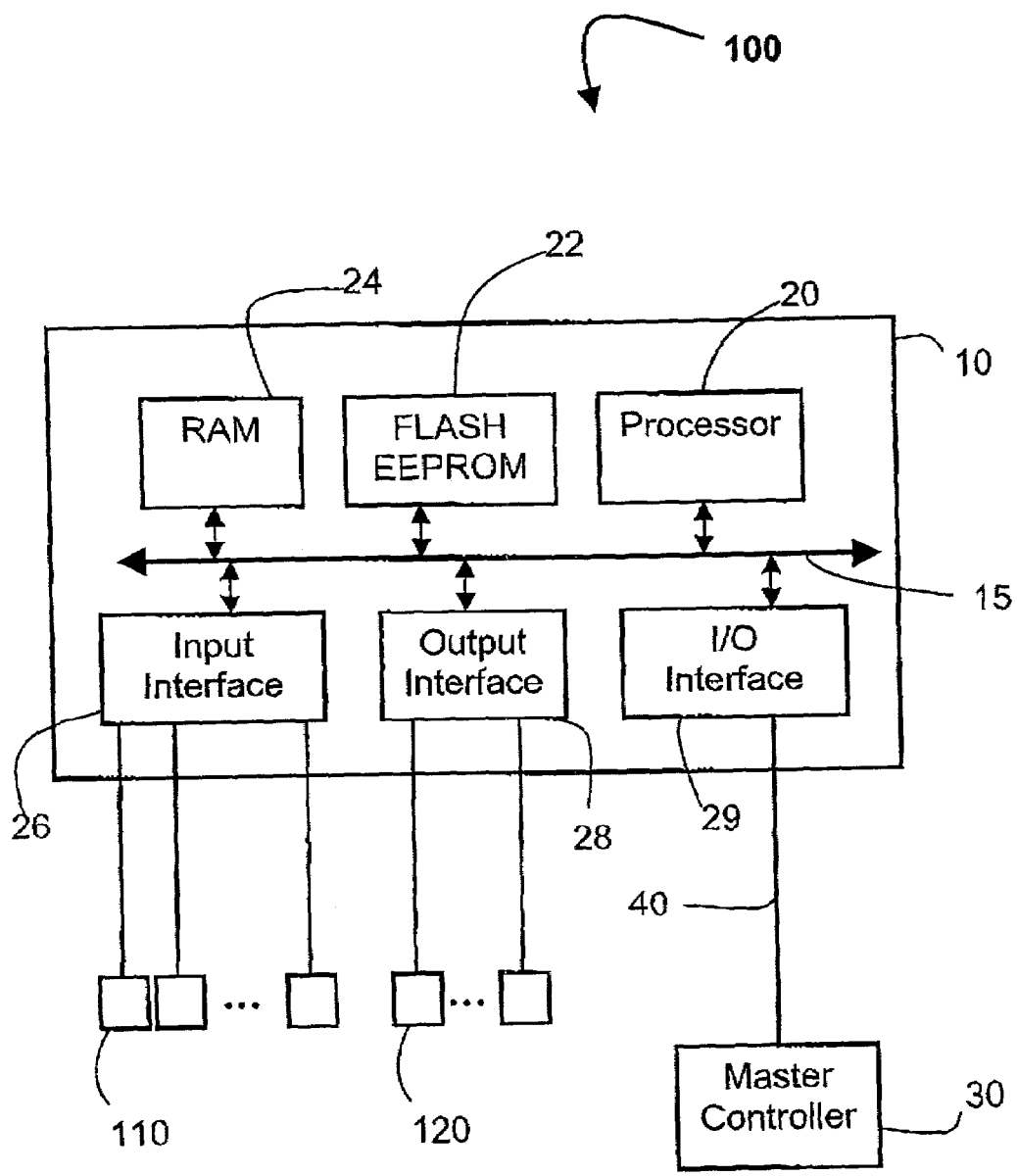
FIG. 1 shows a typical configuration for an embedded system.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a typical configuration for an embedded system 100. The embedded system 100 comprises a microprocessor module 10, input devices such as sensor devices 110 and output devices including actuators 120. The microprocessor module 10 communicates to and from a remote master controller 30 over a communication link 40. The communication link 40 may be a dial-up connection, a wireless radio link or a network connection, such as in an Ethernet Local Area Network (LAN) or a Wide Area Network (WAN).

The microprocessor module 10 typically includes at least one processor unit 20, random access memory (RAM) 24, a Flash electrically erasable programmable read only memory (EEPROM) 22 and input/output (I/O) interfaces including one or more input interfaces 26 for interfacing with the sensor devices 110, output interfaces 28 for interfacing with the actuators 120, and an interface 29 for connecting to the communication link 40. Input interface(s) 26 and output interface(s) 28 may be parallel and/or serial interfaces. The components 20 to 29 of the microprocessor module 10, typically communicate via an interconnected internal bus 15.

Code of an application is resident on the EEPROM 22, and is read and controlled in its execution by the microprocessor 20. Intermediate storage of the code and any data fetched from the master controller 30 and sensor devices 110 are accomplished using the RAM 24. The EEPROM 22 is typically of the order of 1 Mbytes, whilst the RAM 24 may be of the order of 0.5 Mbytes in size.

In operation, the microprocessor module 10 operates to monitor the states of the sensor devices 110 and causes operation of the various actuators 120 in accordance with the code stored in the EEPROM 22 and executed by the microprocessor 20.

The microprocessor 20 is also capable of detecting a number of types of faults, including abnormal operation of any of the connected sensor devices 110, abnormal operation of any of the connected actuators 120 and internal hardware. The microprocessor 20 is further capable of detecting software faults, such as the integrity of the memory 22 and 24, whether software interrupts are enabled and whether the I/O interfaces 26, 28 and 29 are operating correctly.

Figure 2:
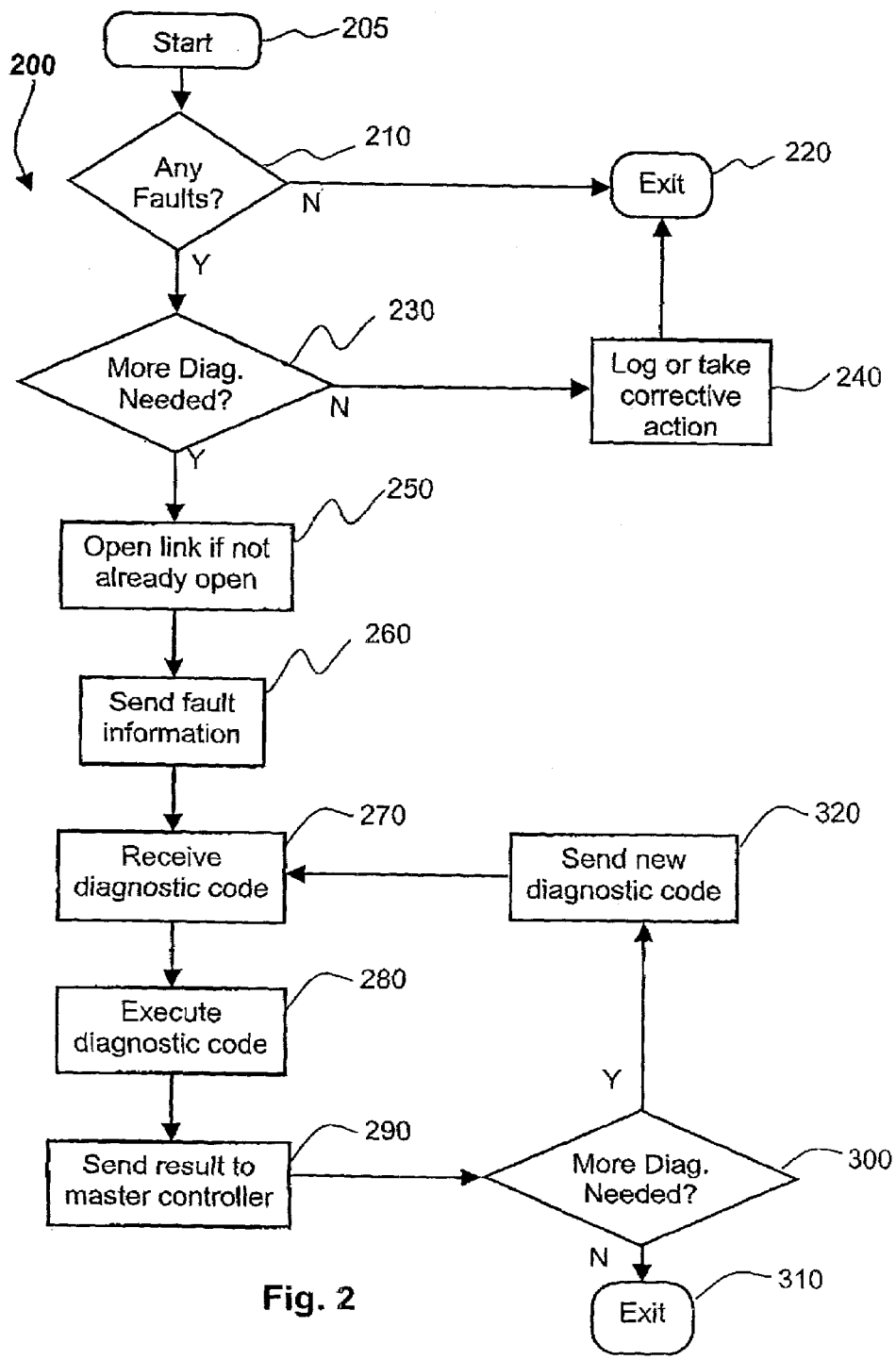
FIG. 2 shows a flow-diagram of a method of allowing the embedded system shown in FIG. 1 to diagnose faults.

FIG. 2 shows a flow-diagram of a method 200 for allowing an embedded system 100 to diagnose faults, and "work around" (or rectify) certain faults, using code which does not reside in the microprocessor module 10, and in particular, the RAM 24 of the microprocessor module 10. The method 200 typically is implemented as a subroutine in the application controlled in its execution by the microprocessor 20. In particular, the steps of method 200 are effected by instructions in the code that are executed by the microprocessor module 10, except where, clearly, those steps are being performed by code executed in the remote master controller 30.

The description of method 200 is aided by way of an example. In the example, the microprocessor module 10 is an engine management system for controlling a motor vehicle's engine. Inputs for a number of sensor devices 110 are used to calculate a current load of the engine. The load calculation may be done mathematically, or by using a look-up table. The calculated current load is then used to determine the correct amount of fuel and spark to use for optimal performance. The optimal performance may be to optimise speed or fuel economy.

The engine management system communicates to and from the remote master controller 30 over a wireless radio link. The sensor devices 110 include a first thermostat inside a radiator for measuring water temperature, a second thermostat outside the radiator for measuring air temperature, a pressure sensor, a position sensor etc.

Within the code of the application, there is self-diagnostic code for detecting fault conditions. This self-diagnostic code responds by raising an alarm when a fault occurs either in the equipment or in data traffic flowing through the microprocessor module 10. As noted above, the self-diagnostic code is limited, because of restrictions upon memory 22 and 24 of the microprocessor module 10 and cost sensitivity of the product. Therefore, only the very essential tests are performed.

Accordingly, after starting in step 205, the method 200 determines in step 210 whether any fault conditions are detected by the microprocessor module 10. With no fault conditions detected, the method 200 ends in step 220 and returns to the main application.

If a fault condition has been detected, then the method proceeds to step 230, where it is determined whether a deeper level of diagnostics is required than the self-diagnostic code can provide. For example, if a sensor device 110 has an absolute operating range of 1 to 12 units, and a normal operating range of 2 to 10 units, and a value outside the normal operating range is received by the microprocessor module 10, then it indicates a fault condition. In the case with the value received from the sensor device 110 being outside the normal operating range, it is apparent that the fault condition results from a fault related to the particular sensor device 110.

However, if for example the values received from two or more sensor devices 110, when considered jointly, indicates a fault condition, but all the individual values are inside their respective normal operating ranges, then a deeper level of diagnostics is required to identify the faulty sensor device 110. For example, the first thermostat, which is inside the radiator, measures a water temperature of 0° C., which is within the normal operating range of the first thermostat. The second thermostat, which is outside the radiator, measures the air temperature as 30° C., which also is within the normal operating range of the second thermostat. However, when considered jointly, during normal operating conditions, the temperature of the water inside the radiator should be higher than that of the air outside. This indicates a fault with one of the two thermostats, and that a deeper level of diagnostics is required in order to correctly identify the particular one.

If the self-diagnostic code is sufficient to diagnose the fault condition(s), then the method 200 proceeds to step 240 where the nature of the fault is logged, or corrective action is taken, and the method 200 ends in step 220 The fault code determines what action is taken.

The corrective actions may include, for example, on a sensor device 110 failure, interpolating between other sensed values from related sensor devices 110 to provide an estimate of the value of the now faulty sensor device 110. Another solution may be to switch operation to a redundant circuitry.

If step 230 determines that the self-diagnostic code resident in the microprocessor module 10 is insufficient to diagnose the fault condition(s), then the method 200 proceeds to step 250, where the microprocessor module 10 establishes a communication link 40, if not already present, with the remote master controller 30.

In step 260 the nature of the problem is communicated to the remote master controller 30. This is typically in the form of fault codes. The remote master controller 30 responds by downloading diagnostic code to the microprocessor module 10. The diagnostic code may be in the form of code for performing further tests, for example to monitor values of certain sensor devices 110 over time, or alternatively code for solving the fault condition, such as a patch code or upgrade in the software. This diagnostic code is received and stored in the RAM 24 of the microprocessor module 10.

In step 280, the newly downloaded diagnostic code, now resident in the RAM 24, is executed by the microprocessor 20. If required by the downloaded diagnostic code, results obtained by the downloaded diagnostic code are communicated back to the remote master controller 30 in step 290. This is typically done when the downloaded diagnostic code includes code for performing further tests. Alternatively an "All Clear" message is sent to the remote master controller 30.

In the above example, one method of identifying which thermostat is faulty is by monitoring the value of these thermostats over time. The faulty thermostat would most likely be stuck on one value, whereas the other(s) would fluctuate over time as the engine warms up and cools down.

Once the faulty sensor device 110 has been identified, the corrective actions may again include, interpolating between other sensed values from related sensor devices 110 to provide an estimate of the value of the now faulty sensor device 110.

Such an interpolated or inferred value would not be completely accurate, which may cause sub-optimal performance. The master controller 30 may have an alternative look-up table available, which has been especially designed not to use a particular sensor device. In the example, the look-up table may only use the water temperature sensor, in the case when the air temperature sensor is faulty, to arrive at the engine load.

Accordingly, only one look-up table is stored in the limited EEPROM 22, and a new look-up table would occupy the same memory space as the replaced look-up table.

In step 300 and on receipt of the further test results by the remote master controller 30 if required, the remote master controller 30 determines whether further diagnostic code needs to be downloaded to the microprocessor module 10. If the fault condition has been solved or "worked around" then the method 200 ends in step 310.

However, if the remote master controller 30 in step 300 determines that further diagnostic code needs to be downloaded to the microprocessor module 10 (i.e. the result of the diagnostic code being executed is equivocal, indefinite or negative), then the method continues to step 320 where the remote master controller 30 downloads further diagnostic code to the microprocessor module 10. The further diagnostic code is received by the microprocessor module 10 in step 270 where it is, as before, stored in the RAM 24.

Therefore, the embedded system 100 performing the method 200 allows a large variety of diagnostic tests to be preformed on the embedded system 100, and more particularly on the microprocessor module 10, which does not usually have adequate memory to hold the code for the diagnostic tests all the time. It enables a means for identifying a fault condition very precisely and provides a means for giving the embedded system 100 an opportunity to rectify the fault condition without having to send a service person into the field.

Figure 3:
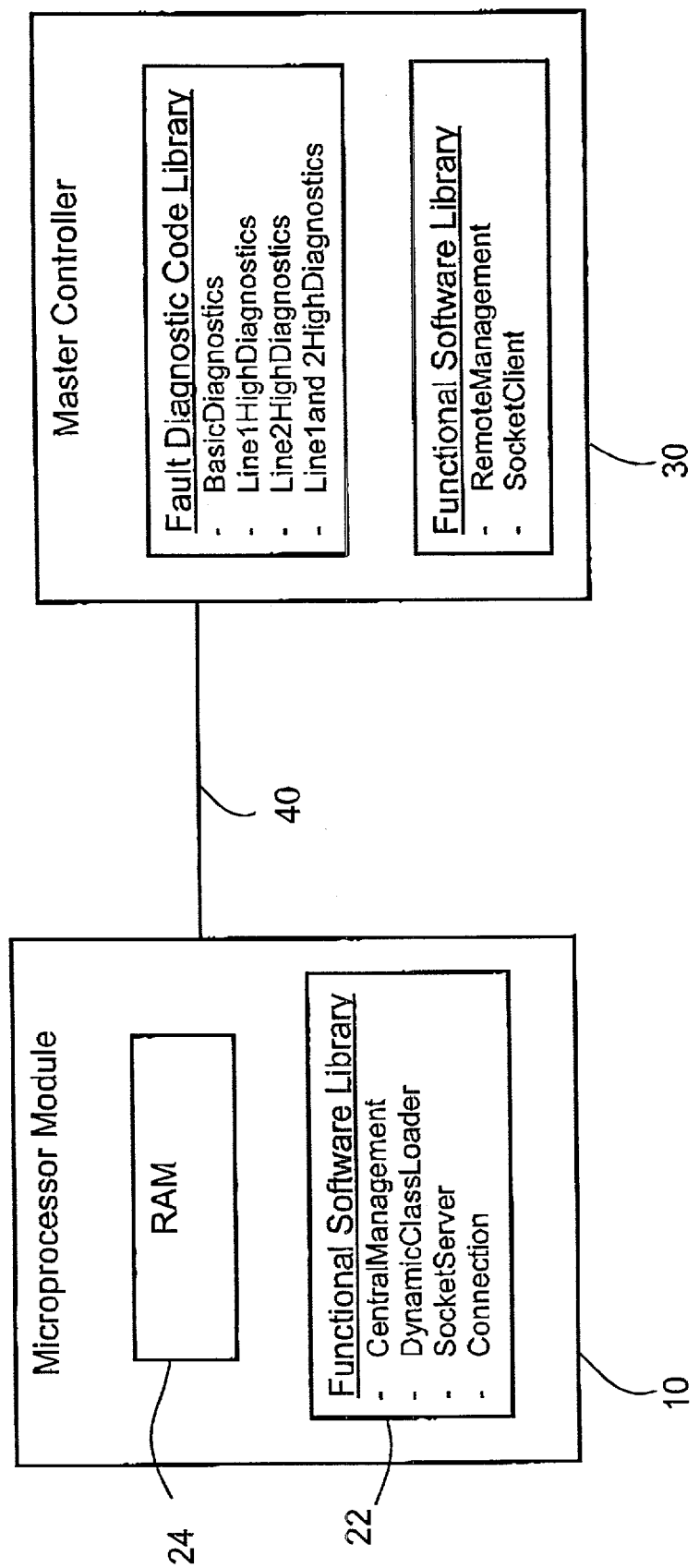
FIG. 3 is a schematic diagram identifying key software components.
Figure 4:
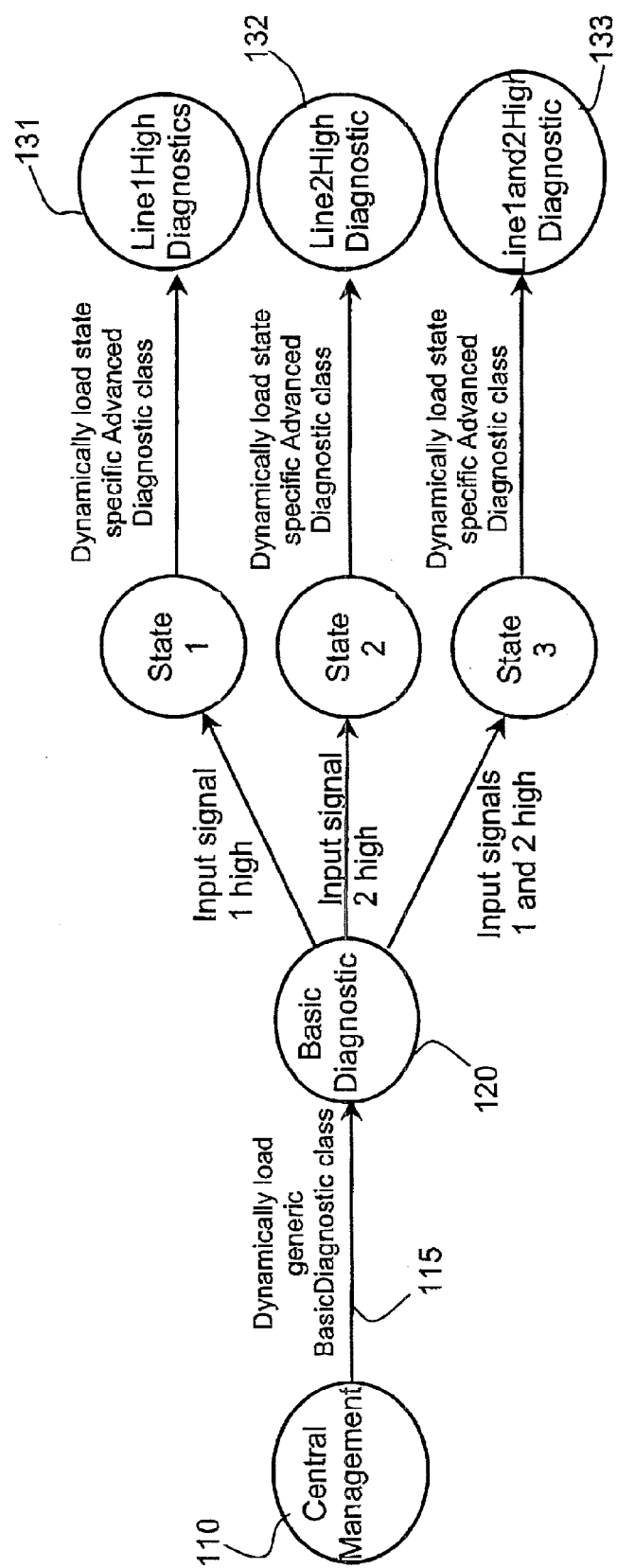
FIG. 4 is a schematic diagram identifying the conditions when each of the diagnostic software components are loaded; and
 Appendices A to J provides code listings for each of the software components used in an example implementation.

A specific software implementation will now be described with reference to FIGS. 3 and 4. FIG. 3 illustrates software components resident or passed between the microprocessor module 10 and the master controller 30 in practice of the method 200 described above, The microprocessor module 10, such as a MBX860 single board computer (SBC), is connected to two sensor devices 110, each of which passes a binary "low" value to the microprocessor module 10 in a "normal" condition. In the event that a fault condition occurs, one or both of the sensor devices pass a binary "high" value to the microprocessor module 10. The software components are written in the Java programming language, and employ C/C++ programming language routines, through Java Native Interface (JNI) methods, to directly interface with hardware within the embedded system 10.

Together with code for the application (not illustrated), a software component CentralManagement is resident in the EEPROM 22 for, amongst other functions, determining whether any fault conditions occurred. This is done by detecting status changes of the sensor devices 110. It further attempts to diagnose the fault condition(s). This is shown as step 110 in FIG. 4.

If a deeper level of diagnostics is required than what the CentralManagement software component can provide, a software component BasicDiagnostic is required, which is not amongst the set of classes loaded into the microprocessor module 10 at execution time. In step 115, the microprocessor module 10 dynamically loads the BasicDiagnostic software component from the master controller 30 using a DynamicClassLoader software component, which loads the remote software component via a specified URL.

In the example implementation, the BasicDiagnostic software component determines in step 120, which of the input signals is high, ie. which fault condition exists. There are three possible fault conditions, indicated as State 1, State 2 and State 3. Depending on which of the three possible fault conditions was identified by the BasicDiagnostic software component, the microprocessor module 10 then dynamically loads the following advanced diagnostic software component from the master controller 30:

| Input device 1 | Input Device 2 | Advanced Diagnostic software component |
|---|---|---|
| 1 | 0 | Line1HighDiagnostics |
| 0 | 1 | Line2HighDiagnostics |
| 1 | 1 | Line1and2HighDiagnostics |

One of the advanced diagnostic software components is then executed by the microprocessor module 10 in step 131, 132 or 133.

In addition to the CentralManagement and DynamicClassLoader software components, and as illustrated in FIG. 3, the microprocessor module 10 further has a SocketServer and a Connection software components stored in its functional software library. The master controller 30 additionally has a RemoteManagement and a SocketClient software components stored in its functional software library. Java code for each of the software components follows as Appendices A to J.

The foregoing describes only one embodiment of the present invention, and modifications and/or changes can be made thereto without departing from the scope and spirit of the invention, the embodiment being illustrative and not restrictive.

I claim:

1. A method, said method comprising:
   determining fault information of one or more fault conditions;
   communicating said fault information from an embedded system to a master controlle, said embedded system having limited storage capacity to hold diagnostic code;
   receiving at said embedded system diagnostic code corresponding with said fault information from said master controller, wherein said one or more fault conditions relate to one or more faulty sensor devices connected to said embedded system; and
   executing said diagnostic code to interpolate between values of related sensor devices to estimate one or more values corresponding to said one or more faulty sensor devices, and to diagnose one or more fault conditions associated with said embedded system based on said one or more estimated values.

2. A method according to claim 1, further comprising:
   initially establishing a communication link with said master controller.

3. A method according to claim 1, further comprising:
   communicating results from executing said diagnostic code to said master controller; and
   in the event that the results are insufficient, receiving further diagnostic code from said remote controller.

4. A method according to claim 1, further comprising:
   relating said one or more fault conditions to faulty circuitry in the embedded system; and
   using said diagnostic code to switch to redundant circuitry in the embedded system.

5. A method according to claim 1, further comprising:
   relating another of said one or more fault conditions to faulty circuitry of auxiliary equipment connected to said embedded system; and
   using said diagnostic code to switch to redundant circuitry of said auxiliary equipment.

6. A method according to claim 1, further comprising:
   configuring said diagnostic code to comprise patch code or an upgrade to system code.

7. A method according to claim 1, further comprising:
   configuring said master controller to be remote from said embedded system.

8. An embedded system, comprising:
   limited memory configured to store operational and diagnostic code;
   a processor configured to execute said operational and diagnostic code; and
   a communications port by which data is transmitted and received, wherein, upon detection of a fault condition relating to a faulty sensor device connected to said embedded system,
      said processor requests diagnostic code from a remote site via said communications port,
      said memory receives and stores said diagnostic code, and said processor executes the diagnostic code to interpolate between a value of a related sensor device to estimate a value corresponding to said faulty sensor device and generates said fault diagnosis based on said estimated value.

9. A system according to claim 8, wherein, upon detection of a fault condition related to faulty circuitry associated with said embedded system, said diagnostic code causes said processor to switch to redundant circuitry as fault rectification.

10. A system according to claim 8, wherein said diagnostic code includes patch code or an upgrade to operational code.

11. A computer program embodied on a computer readable medium, the computer program comprising computer readable instructions configured to execute the following instructions:
   determining fault information of one or more fault conditions; communicating said fault information from an embedded system to a master controller said embedded system having limited storage capacity to hold diagnostic code;
   receiving at said embedded system diagnostic code corresponding with said fault information from said master controller, wherein said one or more fault conditions relate to one or more faulty sensor devices connected to said embedded system; and
   executing said diagnostic code to interpolate between values of related sensor devices to estimate one or more values corresponding to said one or more faulty sensor devices, and to diagnose one or more fault conditions associated with said embedded system based on said one or more estimated values.

12. A computer program according to claim 11, further comprising:
   establishing a communication link with said master controller.

13. A computer program according to claim 11, further comprising:
   communicating results from executing said diagnostic code to said master controller; and
   in the event that the results are negative, receiving further diagnostic code from said remote controller.

14. A computer program according to claim 11, further comprising:
   relating another of said one or more fault conditions to faulty circuitry in the embedded system; and
   using said diagnostic code to switch to redundant circuitry in the embedded system.

15. A computer program according to claim 11, further comprising:
   relating another of said one or more fault conditions to faulty circuitry of auxiliary equipment connected to said embedded system; and
   using said diagnostic code to switch to redundant circuitry of said auxiliary equipment.

16. A computer program according to claim 11, further comprising:
   configuring said diagnostic code to comprise patch code or an upgrade to system code.

17. A computer program according to claim 11, further comprising:
   configuring said master controller to be remote from said embedded system.

18. An embedded system, comprising:
   limited memory means for storing operational and diagnostic code;
   processor means for executing said operational and diagnostic code; and
   communications port means by which data is transmitted and received, wherein, upon detection of a fault condition relating to a faulty sensor device connected to said embedded system, said processor means requests diagnostic code from a remote site via said communication port, said memory means receives and stores said diagnostic code, and said processor means executes the diagnostic code to interpolate between a value of a related sensor device to for estimating a value corresponding to said faulty sensor device and generating said fault diagnosis based on said estimated value.

* * * * *